AMPLIFYING AND OSCILLATING CIRCUIT

Filed Aug. 24, 1959 2 Sheets-Sheet 1

INVENTOR
William E. Moulic, Jr.
BY
Burns, Doane, Benedict & Irons
ATTORNEYS

INVENTOR
William E. Moulic, Jr.
BY
Burns, Doane, Benedict & Irons
ATTORNEYS 3,084,226

AMPLIFYING AND OSCILLATING CIRCUIT

William E. Moulic, Jr., Bloomington, Ill., assignor to Automatic Tape Control, Inc., Bloomington, Ill., a corporation of Delaware Filed Aug. 24, 1959, Ser. No. 835,601
5 Claims. (Cl. 179—100.2)

This invention relates to circuit apparatus which is alternately operable as an amplifier or an oscillator and, more particularly, to such apparatus adapted for cooperation with a magnetic recorder to record a control signal or to perform a control function in response to detection of a control signal on the magnetic record member.

The apparatus of the present invention is particularly designed for cooperation with the recording and reproducing apparatus disclosed in an application of Fred L. Bailey, John P. Jenkins, and Vernon A. Nolte, filed on even date herewith, and assigned to the same assignee as the present application. The apparatus of that application is designed particularly for control of the advancement of magnetic tape with respect to a playback head, which control is effective to stop the tape drive at the beginning of information recorded on an endless loop of tape. In order to permit such control, the apparatus of that invention includes provision for recording a control signal at the beginning of recording of the information, the control signal being on a channel of the tape parallel to the information channel. The control signal is detected by its own control head and automatically stops tape drive when the tape has advanced to the position where the control signal was recorded.

The apparatus of the present invention was designed to enable essentially the same circuit to record the control signal during the recording operation and to amplify the detected control signal, during playback, and thereupon to stop tape drive.

More particularly, the apparatus of the present invention includes an electronic amplifier which is provided with a regenerative feedback connection and with a controllable normally-closed switch which normally disables the feedback connection. When the switch is closed, the circuit functions as an amplifier and controls a relay to stop tape drive when an input control signal is supplied to the amplifier. However, when the switch is opened, the regenerative connection permits the circuit to oscillate and to deliver to the control head a control signal which is recorded thereby on the magnetic tape.

It will be apparent that the circuit of the present invention could be used for other purposes than control of the movement of magnetic tape. The apparatus is utilizable for any purpose which requires alternate operation of an amplifier and an oscillator, and particularly for any purpose which requires that a control signal be recorded and that subsequent detection of the signal be employed for a control function. However, the apparatus of the invention will be particularly described herein in conjunction with a recording and reproducing apparatus, and, for such purpose, it includes means for opening the regenerative connection-disabling switch at the beginning of a recording operation, for a period of time which is short in comparison with the length of the endless tape. Thereby, a control signal is recorded on the tape at the beginning of tape movement and the circuit automatically returns to a listening condition in which it is responsive to the same control signal to stop tape drive at the beginning of the recorded information.

The apparatus of the invention will be more fully described in conjunction with a preferred embodiment thereof shown in the accompanying drawings.

Figure 1:
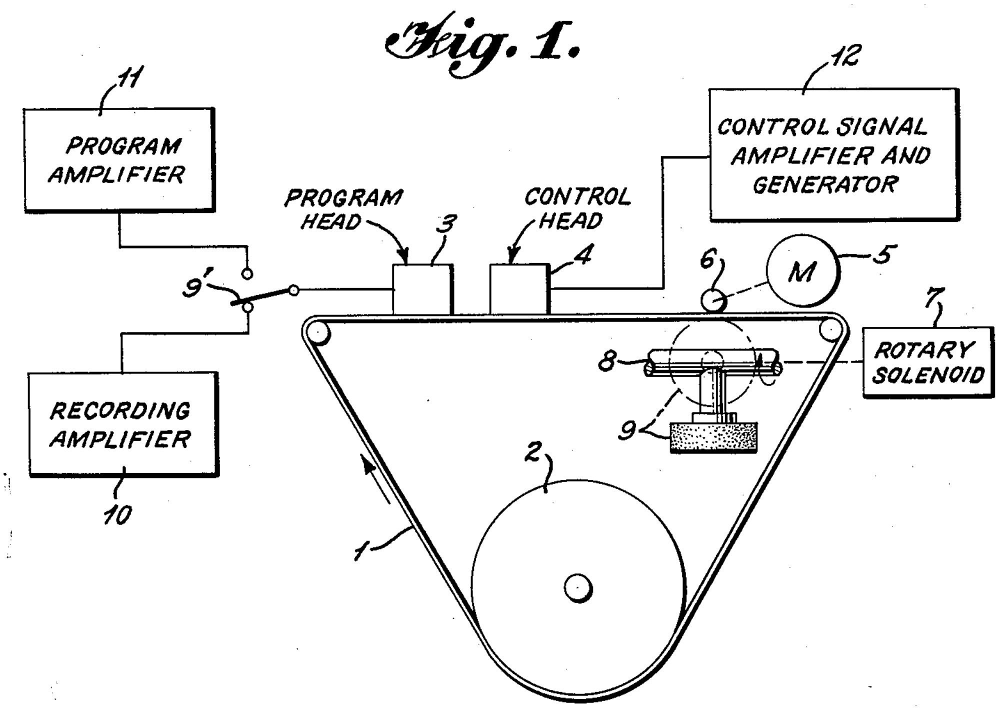
FIG. 1 is a diagrammatic representation of an endless magnetic tape and apparatus cooperating therewith to constitute a recording and reproducing device.

Referring first to FIG. 1, the magnetic tape 1 is preferably mounted in a cartridge of the type described in the patents to Eash, Nos. 2,778,635 through 2,778,637. As shown more clearly in those patents, the tape is unwound from a reel 2 in the direction indicated by the arrow and is advanced past a program recording and reproducing head 3 and a control signal recording and reproducing head 4 and is finally rewound upon the reel 2. To provide for tape drive, the apparatus includes an electric motor 5 which continuously drives a capstan 6, which is positioned adjacent one side of the magnetic tape. The apparatus further includes a rotary solenoid 7 which controls the position of a shaft 8 which carries a pinch roll 9. In the position shown in the drawing, the pinch roll is in its inoperative condition so that rotation of the capstan 6 is not effective to move the tape. However, when rotary solenoid 7 is energized, the shaft 8 rotates the pinch roll into operative position such that it engages the side of the tape opposite the capstan 6. The tape is thereupon frictionally engaged with the capstan and the rotary movement thereof causes the tape to move in the direction indicated by the arrow with respect to the program and control heads.

The program head is connected through suitable switch means diagrammatically indicated at 9 to one of a recording amplifier 10 and a program amplifier 11. The recording amplifier is designed to supply the program head with information to be recorded, when the switch 9 is in the position shown. When the switch is moved to its other position, the program head operates as a playback head and supplies the detected information to the program amplifier. The detected information, of course, can be utilized for any desired purpose, such as broadcasting.

The control head 4 is connected to a circuit indicated in block form at 12 as a control signal amplifier and generator. That circuit will be more fully described in conjunction with FIGURE 3 and it will suffice at this point to state that the control head receives a control signal at the beginning of recording from the circuit 12 and thereafter detects any control signal on the tape and supplies the detected signal to the circuit 12.

Figure 2:
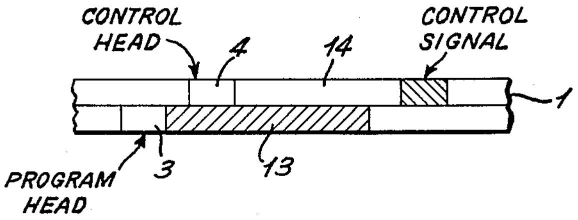
FIG. 2 is a diagrammatic representation of a portion of the endless tape, showing the relationship between the recorded information and the control signal.

The relationship between the control head and program head and between the respective signals on the tape is shown more particularly in FIG. 2. As indicated, the program head 3 is preferably behind the control head 4, with respect to the direction of tape movement. This is for the obvious purpose of permitting the heads to be very closely spaced across the direction of tape movement. The program head records information on a channel indicated at 13 and the control head records its control signal at the beginning of the recording operation in channel 14. The crosshatched areas shown in the figure indicate that recording is in process and that the control signal has been recorded, while the program head is recording the information supplied by amplifier 10.

Figure 3:
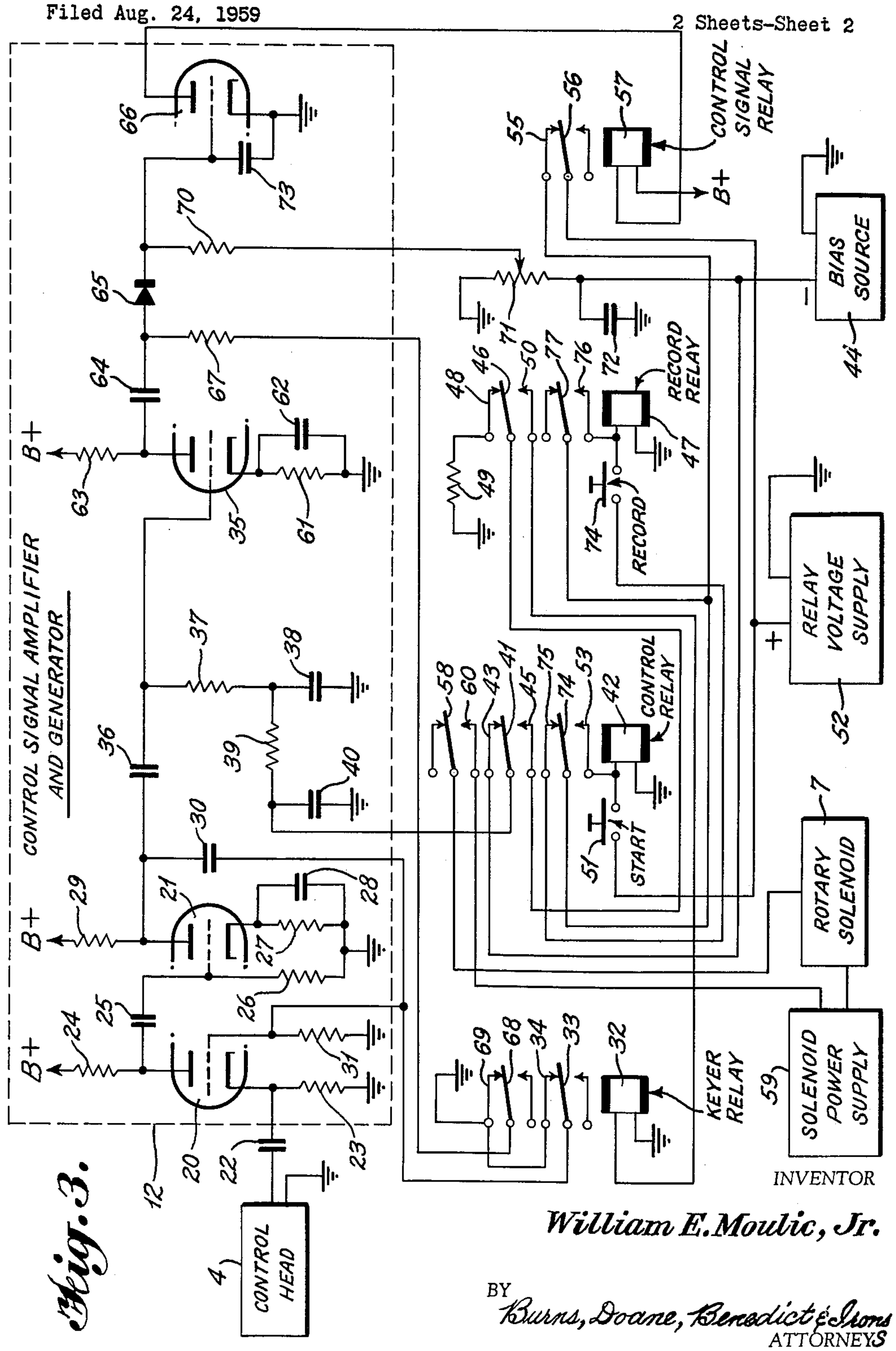
FIG. 3 is a schematic diagram showing the circuit of the present invention in detail and showing its cooperation with the apparatus of FIG. 1.

Referring now to FIG. 3, the control signal amplifier and generator 12 includes a pair of triodes 20 and 21 which may be, as indicated, within the same envelope. One side of the control head is connected to ground, while the other side is connected through capacitor 22 to the cathode of triode 20. The cathode is connected to ground through a resistor 23 so that any signal detected by the control head is developed across the resistor, while any signal delivered to the control head is obtained from across the resistor. The plate of triode 20 is connected to a suitable source of D.C. plate voltage, indicated by the legend B+, through a plate resistor 24 and the voltage developed across that resistor is coupled through coupling capacitor 25 to the control grid of triode 21. That control grid is connected to ground through grid resistor 26, while cathode bias is supplied for tube 21 through the parallel combination of resistor 27 and capacitor 28. The plate of triode 21 is connected to B+ through plate resistor 29, so that an amplified version of any signal supplied to the triode 20 is developed across plate resistor 29.

The plate of triode 21 is coupled back to the control grid of triode 20 through a capacitor 30, and the control grid is connected to ground through grid resistor 31, so that the A.C. plate voltage of the second triode is developed across the grid resistor. This connection, of course, is regenerative, so that the circuit would normally oscillate but for the provision of a switch provided by a keyer relay 32 and its contacts 33 and 34. Contact 33 is connected directly to the control grid of triode 20, while stationary contact 34 is connected to ground. Therefore, when the relay is de-energized, the regenerative feedback voltage is shorted to ground and the circuit functions as an amplifier, rather than as an oscillator.

When the keyer relay is energized, the disabling grounding circuit is opened, and the feedback oscillator operates to supply the control head 4 with a control signal which is recorded on the magnetic tape.

The plate of triode 21 is also connected to the control grid of another triode 35 through a coupling capacitor 36. The control grid of triode 35 is connected to ground through grid resistor 37 in series with charge storage capacitor 38. The series combination of a resistor 39 and a second storage capacitor 40 is connected across capacitor 38. The combination of capacitors 38 and 40 and resistor 39 forms a charge storage circuit, for a purpose to be described.

The junction between resistor 39 and capacitor 40 is connected to the movable contact 41 of a control relay 42. When that relay is deenergized, the movable contact engages fixed contact 43, which is connected to the negative side of a suitable D.C. bias source indicated schematically at 44. The positive side of that source is connected to ground. Thereby, the control grid of triode 35 is supplied with a negative bias when the control relay is not energized. This negative bias maintains the triode 35 blocked, so that plate current does not flow.

The stationary contact 45, which is engaged by movable contact 41 when the control relay is energized, is itself connected to a movable contact 46 of a record relay 47. When that relay is de-energized, the movable contact 46 engages a fixed contact 48 which is connected through a discharge resistor 49 to ground. Thereby, when the control relay is energized but the record relay is de-energized, the charge on capacitors 38 and 40 is discharged through resistor 49. The negative bias on tube 35 then decreases exponentially until the tube is cut on. The R-C discharge time is selected so that the tube 35 begins conduction within a very short time after energization of the control relay. This time period is very short in comparison with the time of one complete cycle of tape movement, and is preferably of the order of one second.

The movable contact 46 of the record relay 47 engages a fixed contact 50 when the relay is energized. That contact is connected to one side of the operating coil of keyer relay 32, while the other side thereof is connected to ground. As a result, when the record relay and control relay are simultaneously energized, the charge storage circuit, including capacitors 38 and 40, discharges through the coil of the keyer relay to energize that relay and interrupt the grounding circuit formed by contacts 33 and 34. The discharge time is preferably of the order of one second, whereupon the disabling bias of tube 35 leaks away and the keyer relay de-energizes.

An operating circuit for the control relay includes a ground connection for one side of its operating coil and a connection through a momentary contact push-button start switch 51 to the positive side of a D.C. relay voltage supply indicated generally at 52. The negative side of the voltage supply is grounded, so that the control relay is energized whenever the start switch is depressed. Since the start switch is of the momentary contact type, the operating coil of the control relay has a holding circuit which includes stationary contact 53 which is connected to the ungrounded side of the operating coil. The cooperating movable contact 54 is connected through stationary contact 55 and movable contact 56 of a control signal relay 57 to the positive side of voltage source 52. When the control relay is energized, contacts 53 and 54 engage to complete the holding circuit and maintain the control relay energized until the control signal relay is energized.

The control relay also includes a movable contact 58 which is connected to one side of the operating coil of rotary solenoid 7. The other side of the operating coil is connected to one side of a suitable solenoid power supply 59. When the control relay is energized, its movable contact 58 engages a stationary contact 60 which is connected to the other side of the solenoid power supply. Therefore, when the control relay is first energized, the rotary solenoid 7 is energized to move the pinch roll 9 to its operative position and begin tape drive. Tape drive then continues, by virtue of the holding circuit for the control relay, until the control signal relay is energized to open that holding circuit.

The triode 35 of the control signal amplifier and generator has a cathode bias circuit including the shunt combination of resistor 61 and capacitor 62. The plate of the triode is connected to B+ through a plate resistor 63. The plate voltage is coupled through D.C. blocking capacitor 64 and diode rectifier 65 to the control grid of a relay tube 66. The junction between capacitor 64 and rectifier 65 is connected through a resistor 67 to movable contact 68 of the keyer relay 32. The movable contact normally engages stationary contact 69 which is connected to ground.

The grid of the relay tube 66 is connected to ground through a grid resistor 70 in series with a potentiometer 71. The terminals of the potentiometer are connected across the bias source 44 and the movable contact of the potentiometer is set so that the relay tube 66 is normally cut off. A filter capacitor 72 is connected across the bias potentiometer 71 and another capacitor 73 is connected between the grid and cathode of the relay tube. The cathode of the relay tube is grounded and its plate is connected through the operating coil of the control signal relay 57 to B+.

The D.C. bias supplied the relay tube 66 by the potentiometer 71 is such that normally the tube is blocked, but when an A.C. signal voltage is delivered by triode 35, the rectifier 65 and associated circuitry supplies the control grid of the relay tube with a positive voltage sufficient to cut the tube on. The control signal relay 57 is then energized.

The record relay 47 has one side of its operating coil connected to ground and the other side connected to the positive side of the relay voltage supply 52 through the series combination of a momentary contact push-button record switch 74, movable contact 54 and stationary contact 75 of control relay 42, and contacts 55 and 56 of the control signal relay. A holding circuit is also provided for the record relay, consisting of stationary contact 76 which is connected to the ungrounded side of the operating coil thereof, and movable contact 77 which is connected to the stationary contact 55 of the control signal relay.

In operation of the apparatus described above, when information is to be recorded on the tape 1, the record switch 74 is depressed to complete an energizing circuit for the record relay through the contacts of the control relay and the control signal relay. The holding circuit including contacts 76 and 77 of the record relay then shunts these contacts of the control relay so that the record relay is maintained energized until the control signal relay de-energizes. Then, the start switch 51 is depressed to complete an energizing circuit for the control relay. That relay energizes and establishes its holding circuit through the normally closed contacts of the control signal relay. When the control relay energizes, its movable contact 41 disengages fixed contact 43 and disconnects the charge storage circuit from the bias source 44. The movable contact engages stationary contact 45 and connects the charge storage circuit across the operating coil of keyer relay 32 through the contacts 46 and 50 of the record relay. The keyer relay is therefore energized and the feedback de-energizing circuit is opened to permit the circuit, including tubes 20 and 21, to function as an oscillator. The control head 4 is thereupon provided with a control signal as long as the keyer relay is energized.

When the charge on capacitors 38 and 40 has leaked through the keyer relay coil to such an extent that the coil is no longer provided with sufficient current to operate it, the relay de-energizes and disables the feedback circuit to cut off oscillations. The circuit, including tubes 20 and 21, functions thereafter as a simple amplifier to amplify control signals detected by the control head.

At the same time that the keyer relay 32 was energized, the rotary solenoid 7 was provided with operating voltage through contacts 58 and 60 of the control relay. The pinch roll 9 was thereupon rotated into operative position and tape drive began.

Recording continues until all of the information has been recorded and tape drive continues until the portion of the tape which carries the previously recorded control signal reaches the control head 4. Then, the signal provided by the control head is amplified by the circuit including tubes 20 and 21, thus cutting on the plate current of tube 35. The changing plate current of that tube is rectified and supplied as a positive bias to relay tube 66 to cut on the plate current of that tube and operate the control signal relay. Since the holding circuits for the control relay 42 and the record relay 47 are completed through the now disengaged contacts 55 and 56 of the control signal relay, these relays de-energize. When the control relay de-energizes, the operating circuit for the rotary solenoid 7 is interrupted and the usual spring return of that solenoid operates to move the pinch roll 9 to its inoperative position and tape drive stops. Since there is now no relative motion between the tape and the control head, the negative bias on the control grid of relay tube 66 turns off the tube and the control signal relay de-energizes.

When it is desired to play back the information which has been recorded on the tape, it is only necessary to depress the start switch 51. This causes energization of the control relay to begin tape drive. Since the portion of the tape which carries the control signal is at this time opposite the control head, tape drive would be immediately halted if some means were not provided for preventing the control signal relay from being energized at this time. This means is provided by the charge storage circuit including capacitors 38 and 40 which discharge through resistor 49. The negative bias provided by this circuit for the tube 35 remains sufficient to maintain the tube cut off until the tape has advanced to such an extent that the control signal has passed the control head 4. Then, the negative voltage supplied by the charge storage circuit is sufficiently low that any control signal thereafter detected by the control head is effective to pass current through the tube 35. When the recorded information has all been played back, tape drive continues until the area of the tape which carries the control signal again reaches the control head. The operation of the apparatus to stop tape drive is then the same as described above.

It is to be noted that the resistor 67 connected in the grid circuit of relay tube 66 is connected to ground through the normally closed contacts 68 and 69 of the keyer relay. This connection is provided in order that there may be no possibility of the relay tube 66 being cut on during the time when the control signal is recorded on the tape. Energization of the keyer relay at this time interrupts the ground return circuit to prevent the relay tube from receiving a voltage such as to overcome its negative bias.

It will be apparent that many minor changes could be made in the apparatus above described without departure from the scope of the invention. In particular, the various tubes employed could be replaced by transistors, if desired. Further, as indicated above, the amplifier-oscillator of the invention could be employed for other purposes than that disclosed herein, and the control function achieved through detection by the control head of the control signal could be employed for some purpose other than stopping tape drive. Therefore, the invention is not to be considered limited to the particular embodiment disclosed, but rather only by the scope of the appended claims.

I claim:

1. Apparatus comprising a record-playback transducer operable alternately to record a control signal on a record member cooperatively associated with said transducer and to detect said control signal, an electronic amplifier having input means and an output element responsive to a signal on the input means at an enhanced electrical level, fixed bilateral means connecting said transducer to the input means of said amplifier, a regenerative connection between said input means and output element of said amplifier operable when not disabled to cause the amplifier to oscillate and thereby to deliver a control signal to said transducer, a relay connected to the output element of said amplifier for control thereby and operable upon detection of a control signal by said transducer when said regenerative connection is disabled to perform said control function, and means controllable to disable said regenerative connection.

2. Apparatus comprising a record-playback head of a magnetic recorder operable alternately to record a control signal on a magnetic record member moving across said head and to detect said control signal, a vacuum tube amplifier including a pair of triode R-C coupled stages, fixed bilateral means for connecting said head to the cathode of the first triode, a regenerative capacitive connection between the plate of the second triode and the grid of the first triode, a conductive impedance connected between each of the grid and cathode of said first triode and a point of reference potential, a switch operable in only one of its conditions to connect the grid of said triode directly to said point of reference potential, said amplifier being operable to oscillate when said switch is not in said one condition to supply said head with a control signal, a relay, means for connecting the plate of said second triode to the operating coil of said relay to change the condition of the relay when said switch is in said one condition and said head detects a control signal, said relay being thereupon operable to perform said control function.

3. Apparatus adapted for use with a continuous loop magnetic tape and a record-playback head operable to record information thereon and playback information therefrom comprising a control head cooperable with a parallel channel of the tape to the channel opposite the record-playback head, means operable when energized to drive the tape with respect to the two heads, means including a first relay operable when the relay is energized to energize said driving means, means for energizing said first relay at the start of a record or playback operation, a vacuum tube amplifier including at least two tubes each having a cathode, control grid and plate, fixed bilateral means connecting said control head to the cathode of the first of said tubes, a capacitor connected regeneratively between the plate of the second tube and the control grid of the first tube, a second relay operable when deenergized to connect the control grid of said first tube to a point of reference potential to prevent the amplifier from functioning as an oscillator but operable when energized to interrupt such connection to permit generation of a control signal by the amplifier, a third relay operable when energized to de-energize said first relay to interrupt tape drive, means connected between the plate of said second tube and said third relay operable when said control head detects a control signal on said tape to energize said third relay, and means for energizing said second relay at the beginning of a recording operation for a predetermined time period short in comparison with the time it takes the entire tape to pass the record-playback head.

4. The apparatus of claim 3 in which said means for energizing said second relay includes a D.C. voltage source having its positive terminal connected to said point of reference potential, a capacitor charge storage circuit, means including contacts of said first relay operable when the relay is de-energized to connect said charge storage circuit across said source, a fourth relay, means including second contacts of said first relay and contacts of said fourth relay which are closed when the respective relays are energized operable to disconnect said charge storage circuit from said source and to connect it to said second relay to discharge it through the operating coil thereof, and means including a record switch operable when the switch is closed to energize said fourth relay.

5. The apparatus of claim 4 in which said means connected between the plate of said second tube and said third relay includes a third tube having at least a cathode, control grid and plate, said third tube being operable to energize said third relay when plate current flows therethrough, said charge storage circuit being connected between the control grid and cathode of said third tube to bias the tube to cutoff except when a substantial portion of the charge stored therein has been discharged, a discharge resistor, and means including said second contacts of said first relay and contacts of said fourth relay which are closed when the relay is de-energized operable to connect said charge storage circuit across said resistor to discharge the circuit when the first relay is energized to start tape drive but the fourth relay is not energized to start recording.

References Cited in the file of this patent

UNITED STATES PATENTS

| | | |
|---|---|---|
| 2,121,434 | Klinedinst et al. | June 21, 1938 |
| 2,489,202 | Sellinger | Nov. 22, 1949 |
| 2,675,430 | Clarke | Apr. 13, 1954 |
| 2,702,315 | Roderick | Feb. 15, 1955 |
| 2,766,381 | Davis | Oct. 9, 1956 |
| 2,811,588 | Julie | Oct. 29, 1957 |
| 2,943,188 | Knott | June 28, 1960 |